United States Patent [19]

Röhm

[11] Patent Number: 4,602,799
[45] Date of Patent: Jul. 29, 1986

[54] HAMMER-DRILL CHUCK

[76] Inventor: Günter H. Röhm, Heinrich-Röhm-Str. 50, 7927 Sontheim, Fed. Rep. of Germany

[21] Appl. No.: 658,133

[22] Filed: Oct. 5, 1984

[30] Foreign Application Priority Data

Oct. 8, 1983 [DE] Fed. Rep. of Germany ....... 3336703
Feb. 17, 1984 [DE] Fed. Rep. of Germany ....... 3405678

[51] Int. Cl.$^4$ .............................................. B23B 31/16
[52] U.S. Cl. ...................................... 279/114; 279/19; 279/66
[58] Field of Search ................... 279/114, 110, 62, 66, 279/19, 9 R, 11 R, 19.1, 19.2, 19.3, 19.4, 19.5, 19.6, 19.7

[56] References Cited

U.S. PATENT DOCUMENTS

| 51,384 | 12/1865 | Cushman | 279/114 |
| 218,861 | 8/1879 | Cushman | 279/114 |
| 435,475 | 9/1890 | Abrams | 279/114 |
| 465,826 | 12/1891 | Baston | 279/114 |
| 507,598 | 10/1893 | Sellers | 279/114 |
| 1,713,799 | 5/1929 | Whiton | 279/114 |
| 2,598,165 | 5/1952 | Harvey | 279/114 |
| 2,693,966 | 11/1954 | Chasar | 279/114 |

FOREIGN PATENT DOCUMENTS 515505  1/1931  Fed. Rep. of Germany ...... 279/114

Primary Examiner—William R. Briggs
Attorney, Agent, or Firm—Karl F. Ross; Herbert Dubno

[57] ABSTRACT

A chuck has a chuck body centered on a chuck axis and having an axially forwardly opening and axially centered recess and an adjustment ring rotatable but not axially displaceable on the chuck body, having a central hole aligned with the recess, and formed with a plurality of guide passages open radially inwardly into the hole. The body and ring normally are carried on a drill spindle with the shank of a drill bit through the recess and hole and the spindle, shank, and chuck axes all coaxial. Respective jaws radially displaceable in the passages have inner ends engageable with the drill-bit shank in the recess. The chuck body has a face directly axially confronting the jaws and formed with an axially projecting spiral ridge. The jaws have axially projecting teeth complementary to and engaging with the ridge. Thus relative rotation of the body and ring about the axis radially displaces the jaws in the ring.

13 Claims, 9 Drawing Figures

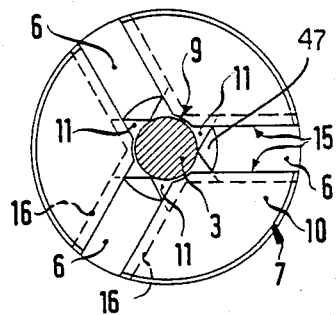
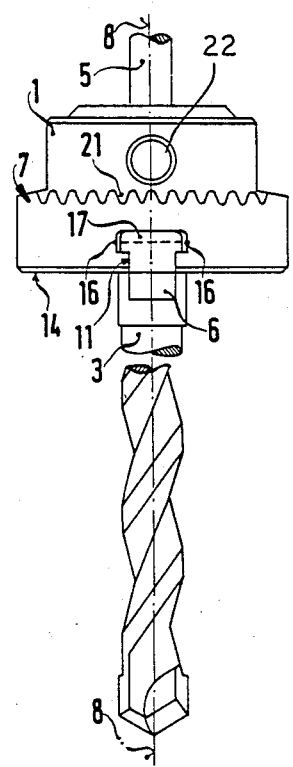
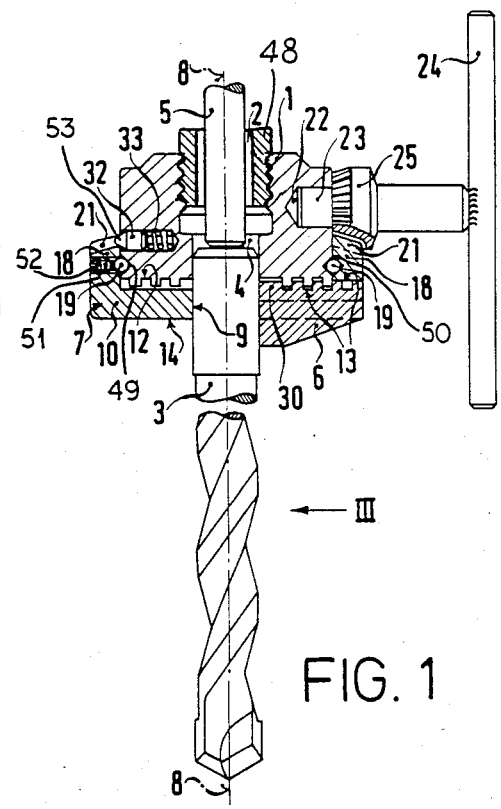

HAMMER-DRILL CHUCK

FIELD OF THE INVENTION

The present invention relates to a drill chuck. More particularly this invention concerns a hammer-drill chuck.

BACKGROUND OF THE INVENTION

A standard hammer drill has a drive spindle that is rotated about a spindle axis and a hammer displaceable axially in the drive spindle. A chuck is carried on the spindle so as to rotate therewith, and holds a drill bit having a shaft having a radially outwardly open and at least generally axially extending groove. he chuck holds the drill bit so it is centered on the spindle axis, and the hammer is effective on the rear end of the drill bit. The bit is rotationally coupled to the chuck body, which as mentioned above is rotated, and is at least limitedly axially reciprocated by the hammer so that it can drill through masonry or the like.

The jaws are normally urged radially outward by springs and are displaced radially inward by an adjustment ring which has threads that mate with teeth on the jaws. This ring is formed of a pair of semicircular parts secured together by a knurled sleeve.

Such a construction is relatively complex to manufacture, and to take apart for subsequent service. It has a large amount of parts that are failure prone, in particular the springs which often rust out. Such chucks are also normally axially fairly long, increasing the lever arm applied to the drill spindle and to its bearings.

It is also possible for the chuck to have a tubular chuck body centered on a chuck axis and having a central axially extending bit-receiving passage and a radially outwardly open chuck-key centering hole. A plurality of jaws radially but not angularly displaceable in the chuck body have inner ends engageable with the drill-bit shank in the passage. An adjustment ring connected to the jaws moves same radially synchronously and thereby centers the bit in the body by engagement of the inner ends with the shank. This ring is formed with axially backwardly directed teeth positioned axially forward of the centering hole such that when a chuck key is fitted into the centering hole its crown gear meshes with the ring teeth. A locking sleeve angularly nondisplaceable on the body carries at least one tooth axially engageable between the ring teeth. This sleeve is axially displaceable on the body between an axially forward locking position with the sleeve tooth engaged with the ring teeth and the sleeve positioned relative to the hole such that the key cannot be fitted to the chuck with the gear meshing with the ring teeth and an axially backward freeing position with the sleeve tooth out of engagement with the ring teeth and the sleeve positioned relative to the hole such that the key can be fitted to the chuck with the gear meshing with the ring teeth. A biasing spring is braced between the sleeve and the body for urging the sleeve axially forward into the locking position. Normally the angular-coupling formations are on the jaws.

Such an arrangement is quite complex and not suitable for use in a highly compact or inexpensive hammer drill.

OBJECTS OF THE INVENTION

It is therefore an object of the present invention to provide an improved drill chuck.

Another object is the provision of such a drill chuck which overcomes the above-given disadvantages, that is which is of very simple construction, which is easy to assemble, disassemble, and service, and which holds the drill bit properly for hammer drilling.

SUMMARY OF THE INVENTION

A chuck according to the invention has a chuck body centered on a chuck axis and having an axially forwardy opening and axially centered recess and an adjustment ring rotatable but not axially displaceable on the chuck body, having a central hole aligned with the recess, and formed with a plurality of guide passages open radially inwardly into the hole. The body and ring normally are carried on a drill spindle with the shank of a drill bit through the recess and hole and the spindle, shank, and chuck axes all coaxial. Respective jaws radially displaceable in the passages have inner ends engageable with the drill-bit shank in the recess. The chuck body has a face directly axially confronting the jaws and formed with an axially projecting spiral ridge. The jaws have axially projecting teeth complementary to and engaging with the ridge. Thus relative rotation of the body and ring about the axis radially displaces the jaws in the ring.

Such an arrangement is extremely simple. It has a bare minimum of parts yet still functions as well as the complex prior-art arrangements. Its assembly is simple, as is its disassembly. The overall axial length of the unit can be very reduced, making the chuck particularly useful in a nonhammer right-angle type drill.

According to this invention the passages can be are axially forwardly open and the passages and jaws are of complementary T-section. They can also be axially forwardly and rearwardly closed and only angularly open for all-around guiding of the jaws.

The ring of this invention has an axially rearwardly projecting rim surrounding the body and the chuck is provided with a stop between the rim and the body for preventing the ring from moving axially relative to the body. This stop can be a member engaged in radially confronting grooves in the rim and the body. The member in turn can be formed by a plurality of balls, or it can be a spring ring that is snap fitted into place. The stop can also be a radially outwardly spring-biased pin carried in the body, in which case the groove of the rim has an array of inwardly open detent recesses in which the pin is engageable, giving this spring-biased pin the double function of an axial stop and a radial detent to prevent the chuck from working loose when in use.

The system of this invention is also provided with a simple abutment that includes a formation for preventing the jaws from moving radially outward in the ring beyond a predetermined outer position. In a particularly simple embodiment the spiral ridge of the front face of the chuck body has an innermost turn of greater thickness than its other turns and constituting the formation. This thick innermost turn also keeps the inner end of the passage substantially closed to prevent chips from entering.

The chuck of the invention also has a sleeve axially displaceable in its recess and having an axially centered and axially backwardly tapering centering surface and a spring braced axially between the sleeve and the body and urging the sleeve axially forward. Thus the tapering surface engages and centers the shank of the bit in the recess. This tapering surface can be smoothly frustoconical or stepped. The sleeve engages axially forward against the ring and the passage of the sleeve is of the same diameter as the hole of the ring and is coaxial therewith.

Furthermore according to this invention the drill has a hammer displaceable axially in the drive spindle and axially forwardly engageable with the bit in the recess. The body and sleeve are formed with like and coaxial guide passages in which the hammer is axially snugly received and displaceable. This hammer is a rod having a forwardly cupped front end centered on the axis.

The body of this invention is also formed with a radially open centering hole adjacent the ring which is formed with an annular array of teeth adjacent the centering hole. A chuck key has a tip engageable in the hole and a gear meshable with the array of teeth while the tip is in the hole. Thus the chuck key can rotate the ring on the body.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 1 is an axial section through the chuck assembly according to the invention, with the chuck key in position;

FIG. 2 is a partly sectional bottom view of FIG. 1;

FIG. 3 is a side view of the assembly according to this invention, taken in the direction of arrow III of FIG. 1, but with the key removed;

SPECIFIC DESCRIPTION

Figure 4:
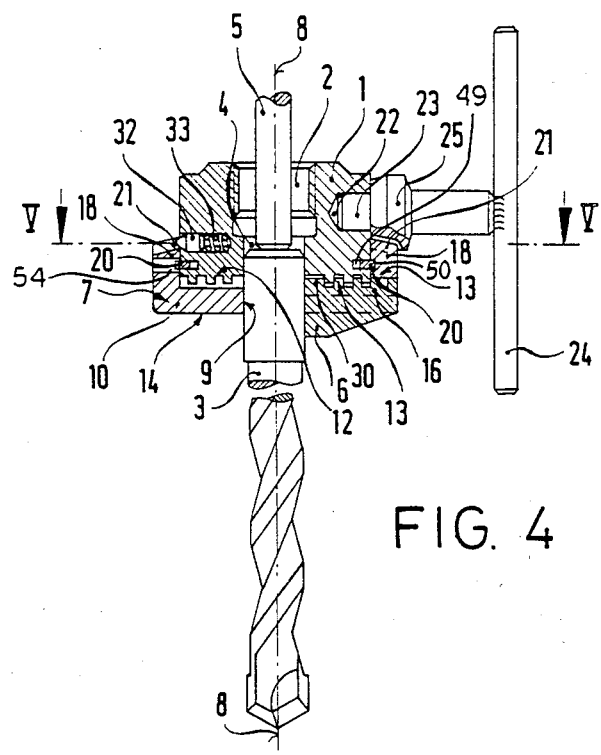
FIG. 4 is an axial section through a second chuck assembly according to the invention.

As seen in FIGS. 1, 2, and 3, a drill chuck has a basically annular body 1 centered on an axis 8 and mounted on a tubular and externally threaded spindle 48 that rotates about this axis 8. A hammer rod 5 projects axially forward (down in the drawing) into the bore 2 from the spindle 48 and the body 1 is formed with a central hole 4 forward of the bore 2 and receiving the cylindrical shank of a masonry bit 3 also centered on the axis.

Three angularly equispaced T-section jaws 6 have hardened-steel tips 47 that are pointed radially inwardly and that serve as indicated in FIG. 2 to center the shank of the bit 3 therein. These jaws 6 are slidable in respective grooves 11 in an adjustment ring 7 that is basically formed as a flat plate 10 perpendicular to the axis and having a planar front face 14 perpendicular thereto and an axially backwardly directed flange 18. The grooves 11 have side flanks 15 formed with grooves 16 in which the ridges or T-arms 17 of the jaws 6 are guided, so that these jaws 6 cannot fall axially forward out of the slots 11. The ring 7 is free to rotate on the body 1 about the axis 8 and is formed with a central cylindrical hole or bore 9 of the same diameter as the bore 4 of the body 1 and coaxial therewith.

The axially forwardly directed front face of the body 1 is formed with a spiral screwthread 12 and the axially rearwardly directed edge of each T-shaped jaw 6 is formed with complementary teeth 13 in mesh therewith. Thus rotation of the ring 7 in one direction about the axis 8 will displace the jaws 6 radially synchronously inward and opposite rotation will displace them radially outward This rotation is effected by means of a row of teeth 21 on the axially backward edge of the rim 18 of the ring 7 and a standard chuck key 24. A radially open centering hole 22 in the body 1 receives the centering tip 23 of the key 24, positioning its gear 25 in mesh with the teeth 21 so that rotation of this key 24 will rotate the ring 7 and thereby position the jaws 6, as is generally known per se.

The radial innermost tooth 30 of each row of teeth 13 has a radial length that is at least equal to the radial stroke of the respective jaw 6 between its innermost and outermost positions. These teeth 30 each serve a double function, both defining the outer position of the respective jaw 6 and blocking off the slot 11. Due to the oversizing of the teeth 30, they are unable to fit between the turns of the spiral thread 12 and radial outward movement of all of the jaws 6 is automatically blocked when the innermost end of the spiral thread 12 engages radially against the side of one of the teeth 30. In addition even in the inner position of the respective jaw 6 the tooth still projects radially back into the slot 11, preventing any chips or the like from getting into these accurately machined guides.

Axial displacement of the ring 7 on the body 1 is inhibited by an annular row of small steel balls 19 received in confronting V-shaped circumferential grooves 49 and 50 formed respectively on the body 1 and in the ring 7. These balls 19 are installed in the grooves 49 and 50, once the two parts 1 and 7 are fitted together with their grooves 49 and 50 aligned, through a radial bore 51 that is subsequently closed with a set screw 52. They can be removed via this bore 51 also.

In order to prevent the jaws 6 from working loose as the chuck is vibrated in use, a plurality of radially spaced detent pins 32 are provided which are radially displaceable in respective radially outwardly open blind bores 54 level with the teeth 21. Springs 33 urge these pins 32 radially outward to press their rounded points 52 between the teeth 21.

The detents 32 are angularly equispaced about the axis 7 they all jointly engage fully between two teeth 21 at the same time. By using nonequiangular spacing it is possible to obtain a finer ratcheting with at any one time only one detent 32 fully engaged between two teeth 21. More specifically when n = number of detents,
K = a whole number, and
b = angle between adjacent teeth 21, the angle a between the detents is determined by:

$$a = Kb + / - b/n.$$

This is described in more detail in my copending application (U.S. Ser. No. 654,792, filed 9/26/84), to which reference should be made for further details.

Figure 5:
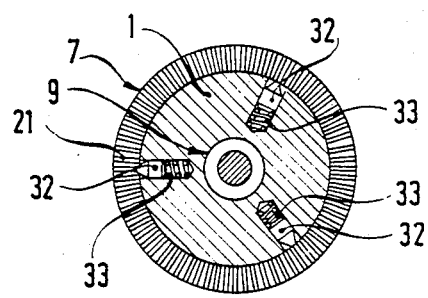
FIG. 5 is a cross section taken along line V—V of FIG. 4.

The arrangement of FIGS. 4 and 5 is identical to that of FIGS. 1 through 3, except that the balls 19 are replaced by an annular but split ring 20 sized to project slightly into the inner groove 49 and into the outer groove 50 also, which here are of complementary rectangular shape. The inner groove 49 is deep enough to receive the entire ring 20 when same is compressed to allow the two parts 1 and 7 to be put together and taken apart. Radial holes 54 are cut at intervals into the rim 18 level with the groove 50 to allow a tool to be inserted to compress the ring 20 and allow the parts 1 and 7 to be separated for servicing.

Figure 6:
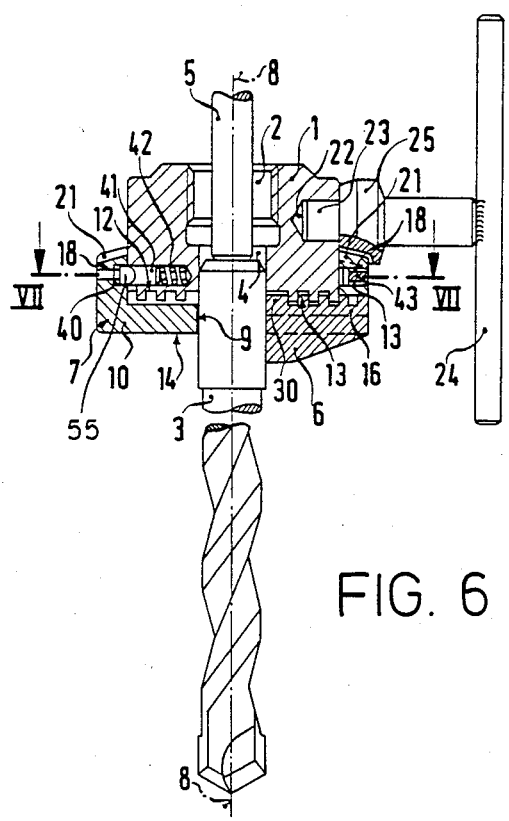
FIG. 6 is an axial section through a third chuck assembly according to the invention.
Figure 7:
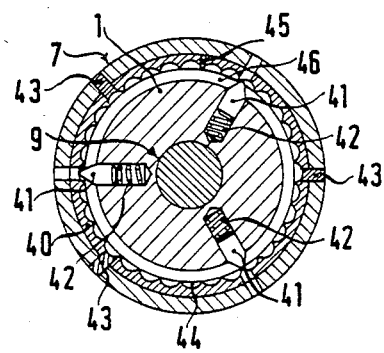
FIG. 7 is a cross section taken along line VII—VII of FIG. 6.

In a similar vein, the system of FIGS. 6 and 7 uses pins 41 like the pins 32 but having pointed tips 55 that project from a radially outwardly open groove 46 of the body 1. Springs 42 behind these detent pins 41 urge them radially outward into to inwardly open recesses 44 of a split spring ring 40 split at 45 and secured in the ring 7 by anchors 43. The pins 41 can be nonequiangularly spaced in the manner described above to define a great number of closely spaced stable positions for the parts 1 and 7.

Figure 8:
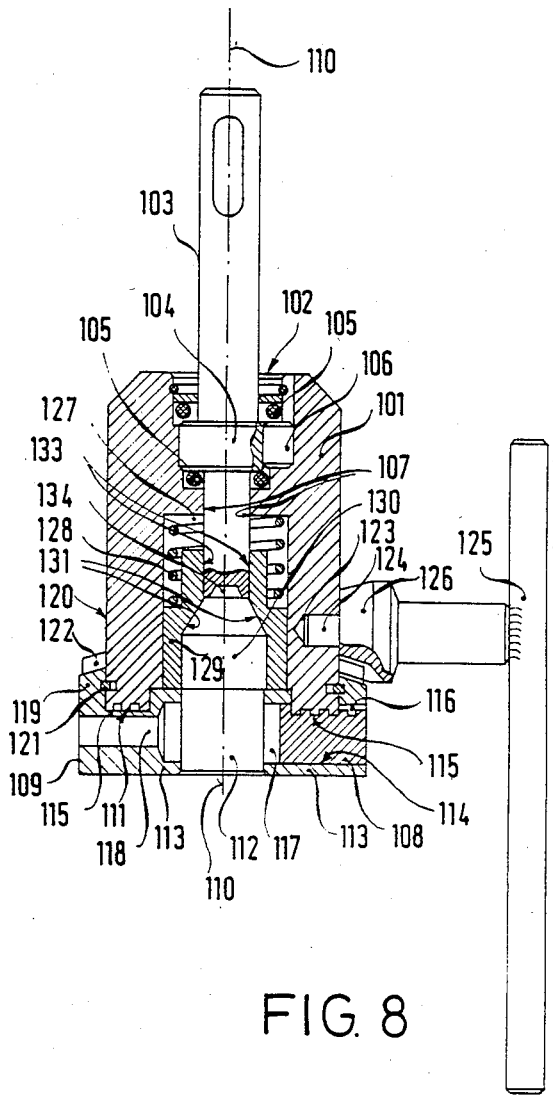
FIG. 8 is an axial section through a fourth chuck assembly according to the invention.

In FIG. 8 a drill chuck has a basically annular body 101 centered on and rotatable about an axis 110. A hammer rod 103 projects axially forward into a bore 102 of the body 101 which is formed with a central hole 107 forward of the bore 102 and receiving the cylindrical shank of an unillustrated masonry bit. This rod 103 caries a stop ring or abutment 104 that is engaged axially between elastic O-rings in the bore 102 so that guided limited displacement of the hammer 103 is possible. In addition a key-type rod 106 partially engaged in the body 101 and partially in the abutment 104 rotationally couples the hammer rod 103 and body 101.

Angularly equispaced jaws 108 have hardened-steel tips 117 that are pointed radially inwardly and that serve to center the shank of the bit. These jaws 108 are slidable in respective guide passages 114 in an adjustment ring 109 that is basically formed as a flat plate 113 perpendicular to the axis 110 and having a planar front face perpendicular thereto and an axially backwardly directed flange 119. The ring 109 is free to rotate on the body 101 about the axis 110 and is formed with a central cylindrical hole or bore 127 coaxial with the bore 107 of the body 101. This ring 109 is formed with radially throughgoing drain holes 118 which allow the assembly to radially throw off chips or the like that fall back into the central passage 112 of the ring 109 when, for instance, boring overhead.

The axially forwardly directed front face of the body 101 is formed with a spiral screwthread 111 and the axially rearwardly directed edge of each jaw 108 is formed with complementary teeth 115 in mesh therewith. Thus rotation of the ring 109 in one direction about the axis 110 will displace the jaws 108 radially synchronously inward and opposite rotation will displace them radially outward.

As in the above-described embodiments, this rotation is effected by means of a row of teeth 122 on the axially backward edge of the rim 119 of the ring 109 and a standard chuck key 125. A radially open centering hole 123 in the body 101 receives the centering tip 124 of the key 125, positioning its gear 126 in mesh with the teeth 122 so that rotation of this key 125 will rotate the ring 109 and thereby position the jaws 108. Axial displacement of the ring 109 on the body 101 is inhibited by an spring ring 121 like the ring 20 of FIGS. 4 and 5.

In this arrangement the front hole 127 is formed by a sleeve 129 having a central passage 103 and bearing axially forward against the rear face of the ring 109. This passage 103 is of the same diameter as the bore 112 of the ring 108, but has a forwardly flaring and axially centered frustoconical portion 131 that tapers back the small-diameter cylindrical passage 133 which is identical to an intermediate passage portion 107 of the body 1. The hammer rod 103 is snugly guided in these bores 107 and 131 and has an axially forwardly concave recess 134 that serves with the frustoconical surface 131 to center the rear end of a bit received in the aligned passages 112 and 130. In addition a spring 128 is braced axially between the sleeve 129 and the floor of the bore 127 to urge this sleeve 129 axially forward. This sleeve 129 will therefore follow the limited axial reciprocation of the chucked bit, keeping it perfectly centered.

Figure 9:
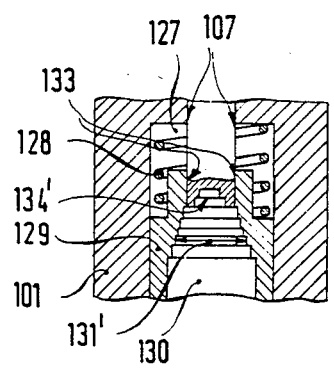
FIG. 9 is an axially sectional view of a detail of a variant on the fourth embodiment of FIG. 8.

In FIG. 9 the parts are the same, except that the sleeve 129 has a stepped surface 131' whose portions are all centered on the axis, and the front end of the hammer is formed with a similarly stepped recess 134' also centered on the axis. These stepped formations 131' and 134' keep standard-size bit shanks perfectly centered in the chuck.

I claim:
1. In combination with
   a hammer drill having a drive spindle rotatable about a spindle axis, and
   a drill bit having a shank extending along a shank axis,
   a chuck comprising:
   a chuck body centered on a chuck axis and having an axially forwardly opening and axially centered recess;
   an adjustment ring rotatable but not axially displaceable on the chuck body, having a central hole aligned with the recess, and formed with a plurality of guide passages open radially inwardly into the hole and with an axially rearwardly projecting rim surrounding the body, the body and ring normally being carried on the sningle with the shank of the drill bit through the recess and hole and the spindle, shank, and chuck axes all coaxial, the rim and body being formed with radially confronting grooves;
   stop means including at least one member engaged radially between the grooves of the rim and the body for preventing the ring from moving axially relative to the body;
   the member comprising a radially outwardly springbiased pin carried in the body, the groove of the rim having an array of inwardly open detent recesses in which the pin is engageable;
   respective jaws radially diplaceable in the passages and having inner ends engageable with the drill-bit shank in the recess, the body having a face directly axially confronting the jaws and formed with an axially projecting spiral ridge, the haws axially projecting teeth complementary to and engaging with the ridge, whereby relative rotation of the body and ring about the axis radially displaces the jaws in the ring.

2. The chuck defined in claim 1 wherein the passages are axially forwardly open and the passages and jaws are of complementary T-section.

3. The chuck defined in claim 1 wherein the passages are axially forwardly and rearwardly closed and are only angularly open.

4. The chuck defined in claim 1 wherein the drill further has a hammer displaceable axially in the drive spindle and axially forwardly engageable with the bit in the recess, the body and sleeve being formed with like and coaxial guide passages in which the hammer is axially snugly received and displaceable.

5. The chuck defined in claim 4 wherein the hammer is a rod having a forwardly cupped front end centered on the axis.

6. The chuck defined in claim 1 wherein the body is formed with a radially open centering hole adjacent the ring which is formed with an annular array of teeth adjacent the centering hole, the combination further comprising:

a chuck key having a tip engageable in the hole and a gear meshable with the array of teeth while the tip is in the hole, whereby the chuck key can rotate the ring on the body.

7. In combination with a hammer drill having a drive spindle rotatable about a spindle axis, and a drill bit having a shank extending along a shank axis, a chuck comprising:

a chuck body centered on a chuck axis and having an axially forwardly opening and axially centered recess;

an adjustment ring rotatable but not axially displaceable on the chuck body, having a central hole aligned with the recess, and formed with a plurality of guide passages open radially inwardly into the hole and with radially throughgoing drain holes, the body and ring normally being carried on the spindle with the shank of the drill bit through the recess and hole and the spindle, shank, and chuck axes all coaxial;

respective jaws radially displaceable in the passages and having inner ends engageable with the drill-bit shank in the recess, the body having a face directly axially confronting the jaws and formed with an axially projecting spiral ridge, the jaws having axially projecting teeth complementary to and engaging with the ridge, whereby relative rotation of the body and ring about the axis radially displaces the jaws in the ring.

8. In combination with a hammer drill having a drive spindle rotatable about a spindle axis, and a drill bit having a shank extending along a shank axis, a chuck comprising:

a chuck body centered on a chuck axis and having an axially forwardly opening and axially centered recess;

an adjustment ring rotatable but not axially displaceable on the chuck body, having a central hole aligned with the recess, and formed with a plurality of guide passages open radially inwardly into the hole, the body and ring normally being carried on the spindle with the shank of the drill bit through the recess and hole and the spindle, shank, and chuck axes all coaxial;

respective jaws radially displaceable in the passages and having inner ends engageable with the drill-bit shank in the recess, the body having a face directly axially confronting the jaws and formed with an axially projecting spiral ridge, the jaws having axially projecting teeth complementary to and engaging with the ridge, whereby relative rotation of the body and ring about the axis radially displaces the jaws in the ring; and a sleeve axially displaceable in the recess and having an axially centered and axially backwardly tapering centering surface; and a spring braced axially between the sleeve and the body and urging the sleeve axially forward, whereby the tapering surface engages and centers the shank of the bit in the recess.

9. The chuck defined in claim 8 wherein the tapering surface is generally frustoconical.

10. The chuck defined in claim 8 wherein the tapering surface is stepped.

11. The chuck defined in claim 8 wherein the sleeve engages axially forward against the ring and the passage of the sleeve is of the same diameter as the hole of the ring and is coaxial therewith.

12. In combination with a hammer drill having a drive spindle rotatable about a spindle axis, and a drill bit having a shank extending along a shank axis, a chuck comprising:

a chuck body centered on a chuck axis and having an axially forwardly opening and axially centered recess;

an adjustment ring rotatable but not axially displaceable on the chuck body, having a central hole aligned with the recess, and formed with a plurality of guide passages open radially inwardly into the hole, the body and ring normally being carried on the spindle with the shank of the drill bit through the recess and hole and the spindle, shank, and chuck axes all coaxial;

respective jaws radially displaceable in the passages and having inner ends engageable with the drill-bit shank in the recess, the body having a face directly axially confronting the jaws and formed with an axially projecting spiral ridge, the jaws having axially projecting teeth complementary to and engaging with the ridge, whereby relative rotation of the body and ring about the axis radially displaces the jaws in the ring; and abutment means including a formation for preventing the jaws from moving radially outward in the ring beyond a predetermined outer position.

13. The chuck defined in claim 12 wherein the spiral ridge has an innermost turn of greater thickness than its other turns and constituting the formation.

* * * * *